(12) United States Patent
Pfante

(10) Patent No.: US 12,393,560 B2
(45) Date of Patent: Aug. 19, 2025

(54) METHOD AND SYSTEM FOR PERFORMANCE EVALUATION OF CLUSTER ALGORITHMS

(71) Applicant: Innoplexus AG, Eschborn (DE)

(72) Inventor: Oliver Pfante, Frankfurt am Main (DE)

(73) Assignee: Innoplexus AG, Eschborn (DE)

( * ) Notice: Subject to any disclaimer, the term of this patent is extended or adjusted under 35 U.S.C. 154(b) by 0 days.

(21) Appl. No.: 17/991,640

(22) Filed: Nov. 21, 2022

(65) Prior Publication Data

US 2024/0168928 A1 May 23, 2024

(51) Int. Cl.
*G06F 16/21* (2019.01)
*G06F 16/28* (2019.01)
*G06F 40/247* (2020.01)

(52) U.S. Cl.
CPC .......... *G06F 16/213* (2019.01); *G06F 16/285* (2019.01); *G06F 40/247* (2020.01)

(58) Field of Classification Search
CPC ..... G06F 16/213; G06F 16/285; G06F 40/247
USPC ........................................................ 707/603
See application file for complete search history.

(56) References Cited

U.S. PATENT DOCUMENTS

| | | | |
|---|---|---|---|
| 10,127,289 B2 | 11/2018 | Manning et al. | |
| 10,853,033 B1* | 12/2020 | Meyles | G06F 7/14 |
| 11,061,874 B1 | 7/2021 | Funk et al. | |
| 11,222,052 B2 | 1/2022 | Hertz et al. | |
| 11,675,816 B1* | 6/2023 | Chandrasekharan | G06F 11/30 |
| | | | 707/737 |
| 2010/0004925 A1 | 1/2010 | Ah-Pine et al. | |
| 2010/0070304 A1* | 3/2010 | Levinson | G16H 10/60 |
| | | | 707/E17.014 |
| 2012/0254188 A1* | 10/2012 | Koperski | G06F 16/353 |
| | | | 707/E17.089 |
| 2017/0052958 A1* | 2/2017 | Manning | G06F 16/285 |
| 2020/0349199 A1* | 11/2020 | Jayaraman | G06F 40/49 |
| 2021/0263903 A1* | 8/2021 | Yan | G06F 16/221 |
| 2021/0272038 A1* | 9/2021 | Kowolenko | G06F 40/20 |
| 2021/0374164 A1* | 12/2021 | Ghoula | G06F 18/22 |

(Continued)

OTHER PUBLICATIONS

Biswas Ashis Kumar, "Integrative Approaches for Large-Scale Biomedical Data Analysis", published at The University of Texas at Arlington, Dec. 1, 2016, 194 pages.

(Continued)

*Primary Examiner* — Hicham Skhoun
(74) *Attorney, Agent, or Firm* — Nicholas Palacio

(57) ABSTRACT

A method and system for evaluating the performance of the cluster algorithm is provided herein. The method and system obtain a first field and a plurality of records, wherein each of the plurality of records is associated with one or more fields. The method and system further compare the first field with the each of the one or more fields, and compute a first score of similarities based on the comparison The method and system further generate a vector for the first field and one or more vectors for each of the one or more fields, and compare the vector for the first field with each of the one or more vectors. The method and system further identify a first plurality of clusters based on the first score of similarities, and generate a tree-structured graph-based model based on the first plurality of clusters. The method and system further calculate a second score of similarities based on the tree-structured graph-based model.

18 Claims, 4 Drawing Sheets

(56) References Cited

U.S. PATENT DOCUMENTS

| | | | |
|---|---|---|---|
| 2022/0004567 A1 | 1/2022 | Tao et al. | |
| 2022/0179883 A1* | 6/2022 | Biernacki | G06F 16/93 |
| 2022/0342901 A1* | 10/2022 | Aggarwal | G06F 40/40 |
| 2022/0414523 A1* | 12/2022 | Khatibi | G06N 20/00 |
| 2023/0018975 A1* | 1/2023 | Sreenivasan | G06F 16/2379 |
| 2023/0143297 A1* | 5/2023 | Kawata | G06F 16/906 |
| | | | 705/7.27 |

OTHER PUBLICATIONS

Hertz Tomer, "Learning Distance Functions: Algorithms and Applications", published at The HebrewUniversity of Jerusalem, Dec. 27, 2006, 168 pages.

* cited by examiner

METHOD AND SYSTEM FOR PERFORMANCE EVALUATION OF CLUSTER ALGORITHMS

TECHNICAL FIELD OF THE INVENTION

The present disclosure is related to method and system for performance evaluation of cluster algorithms. The term "cluster-algorithm" refers to any algorithm which checks class-membership of its input via pairwise similarity computations between the input and the members of the classes.

BACKGROUND OF THE INVENTION

Embodiments of the present disclosure generally relate to a method and a system for performance evaluation of cluster algorithms. The term "cluster-algorithm" refers to any algorithm which checks class-membership of its input via pairwise similarity computations between the input and the members of the classes.

Name normalization, especially in the biomedical domain, is challenging. Biomedical entities have several different surface forms, and the benchmarked algorithms learn representations of them solely based on the synonyms of these entities. For the benchmarked algorithms, each synonym list defines a cluster, and a task of name normalization then assigns a given input string to a correct cluster, that is, entity.

For example, acetylsalicylic acid and aspirin are two different names for the same marketed drug. However, their representing string, that is, their surface form, are completely different. On the other hand, the surface forms arthritis and arthrosis look quite similar even though they name different diseases. Such examples show that not only learning name normalization algorithms from synonym lists is tricky but also their evaluation. A solution to this to use a domain expert that analyses whether the given input string was correctly assigned to the correct cluster by the benchmarked algorithm. However, this may become a serious bottleneck if there is a need to evaluate many name normalization algorithms. In addition, finding an optimal set of hyperparameters for a model becomes very expensive in terms of the time necessary by the domain expert to evaluate each benchmarked algorithm.

Thus, there is a need to improve the performance of cluster algorithms so that the given input string is correctly assigned to the correct cluster.

SUMMARY

The following embodiments present a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a system evaluating a performance of a cluster algorithm, the system comprises a memory configured to store computer-executable instructions, a database comprising a plurality of records, wherein each of the plurality of records is associated with one or more fields, and processor operatively coupled to the memory and the database, the processor configured to execute the computer-executable instructions to at least compare a first field with the each of the one or more fields and compute a first score of similarities based on the comparison. The processor is further configured to execute the computer-executable instructions to generate a vector for the first field and one or more vectors for each of the one or more fields and compare the vector for the first field with each of the one or more vectors. The processor is further configured to execute the computer-executable instructions to identify a first plurality of clusters based on the first score of similarities and the comparison of the vector for the first field with each of the one or more vectors. The processor is further configured to execute the computer-executable instructions to generate a tree-structured graph-based model based on the first plurality of clusters, and calculate a second score of similarities based on the tree-structured graph-based model Some example embodiments disclosed herein provide a method comprising obtaining a first field and a plurality of records, wherein each of the plurality of records is associated with one or more fields, the method may include comparing the first field with the each of the one or more fields and computing a first score of similarities based on the comparison. The method may further include generating a vector for the first field and one or more vectors for each of the one or more fields and comparing the vector for the first field with each of the one or more vectors. The method may also include identifying a first plurality of clusters based on the first score of similarities. The method may also include generating a tree-structured graph-based model based on the first plurality of clusters.

Some example embodiments disclosed herein provide a non-transitory computer readable medium having stored thereon computer executable instruction which when executed by one or more processors, cause the one or more processors to carry out operations for obtaining a first field and a plurality of records, wherein each of the plurality of records is associated with one or more fields. The operations further comprising comparing the first field with the each of the one or more fields and computing a first score of similarities based on the comparison. The operations further comprising generating a vector for the first field and one or more vectors for each of the one or more fields and comparing the vector for the first field with each of the one or more vectors. The operations further comprising identifying a first plurality of clusters based on the first score of similarities and the comparison of the vector for the first field with each of the one or more vectors. The operations further comprising generating a tree-structured graph-based model based on the first plurality of clusters and calculating a second score of similarities based on the tree-structured graph-based model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present disclosure will become apparent upon consideration of the following detailed description of embodiments thereof, especially when taken in conjunction with the accompanying drawings, and wherein.

Figure 1:
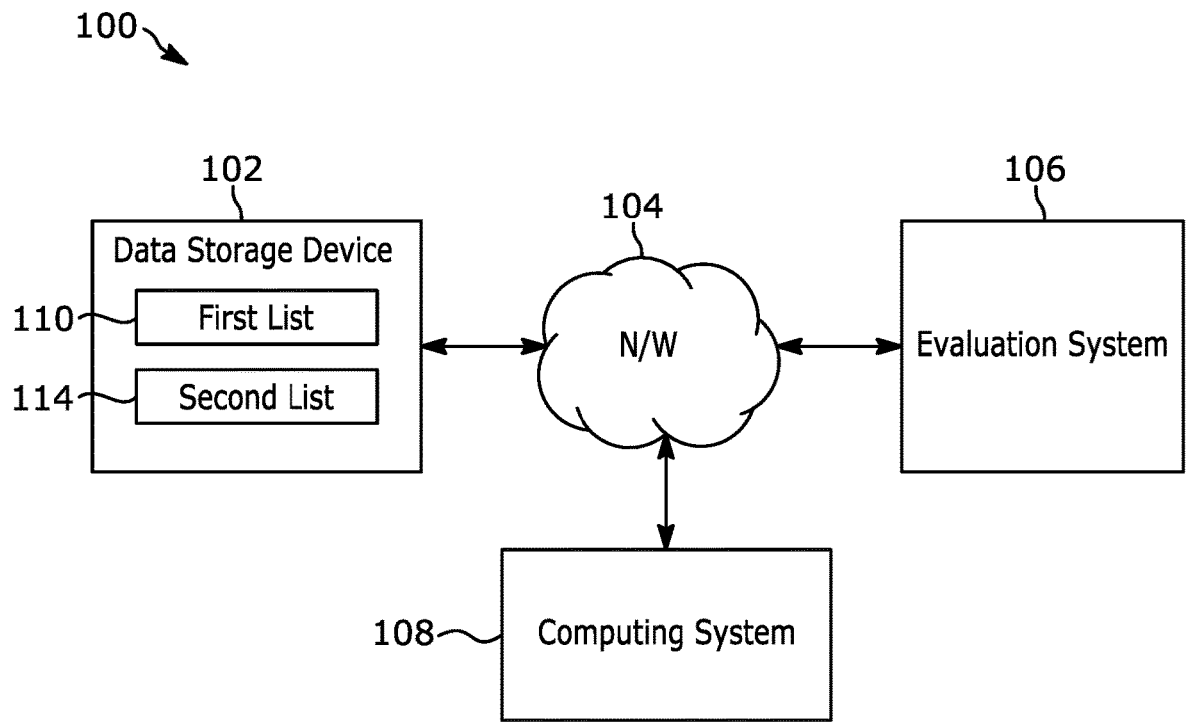
FIG. 1 illustrates a block diagram of a system 100 for evaluating performance of cluster algorithms, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Definitions

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may use to learn from the dataset.

The term "artificial intelligence" may be used to refer to a model built using simple or complex Neural Networks using deep learning techniques and computer vision algorithms. Artificial intelligence model learns from the data and applies that learning to achieve specific pre-defined objectives.

End of Definitions

Embodiments of the present disclosure may provide a method, a system, and a computer program product for performance evaluation of cluster algorithms. The method, the system, and the computer program product for performance evaluation of cluster algorithms are described with reference to FIG. 1 to FIG. 5 as detailed below.

Manual validation by the domain expert in order to determine whether the given input string was correctly assigned to the correct cluster by the benchmarked algorithm is expensive. Moreover, manual validation is infeasible in case hundreds of algorithms require evaluation.

Another solution is to use standard computation metrics for example, but not limited to, F1-score or Receiver Operator Characteristics (ROC). A cluster-algorithm may be used to compute a similarity score for the given input string and all synonyms of all entities. Subsequently, candidates with pairwise similarities beyond a certain threshold are clustered together. Then, binary labels may be assigned: pairs of synonyms belonging to the same entity may be assigned a 1-label. Otherwise, a 0-label may be assigned. Then, from binary classification, metrics for example, F1-score, or ROC, may be computed. Although, this solution eliminates the manual validation, the solution is flawed as there is no consistency of the similarity scores for the given input string and the synonyms of all entities. This further leads to inconsistent clustering. There might be case that synonyms similar to each other might belong to separate clusters.

Thus, there is a need to improve the performance of cluster algorithms so that the given input string is correctly assigned to the correct cluster Accordingly, the present disclosure provides a method, system, or computer program product for evaluating performance of cluster algorithms.

FIG. 1 is a block diagram of an example system 100 for evaluating performance of cluster algorithms, consistent with embodiments of the present disclosure. As shown, example system 100 includes a data storage device 102, a computing system 108, and an evaluation system 106. Further, the data storage device 102, the computing system 108, and the evaluation system 106 can communicate over a network 104.

The data storage device 102 comprises a first list 110 and a second list 114. The first list 110 may include data records. In an embodiment, the first list 110 may include a list of disease unique ID (DUI). The second list 114 may include fields associated with first list 110. In an embodiment, the second list 114 may include list of synonyms for each of the DUIs of the first list 110. The data storage device 102 may include any numbers of lists, including only one list that would represent both the first list 110 and the second list 114. Also, the system 100 may include more than one data storage device 102. In the case of more than one data storage device 102, the first list 110 and the second list 114 may be stored in different data storage devices or may be stored in the same data storage device.

The computing system 108 may include one or more software applications configured to present data and translate a first field from user inputs into requests for record association by the evaluation system 106. In an embodiment, the computing system 108 may be a part of the evaluation system 106. In an embodiment, a user may interact with the system 100 through the computing system 108. In an embodiment, multiple computing devices such as computing system 108 may interact with data storage device 102 and the evaluation system 106.

The evaluation system 106 may be a computing system configured to evaluate the performance of the cluster algorithm. For example, the evaluation system 106 may be a computer system configured to execute software or a set of programmable instructions that collect or receive records from different lists and process those records to associate the first field to one or more fields in the second list 114, resulting in the identification of entity records that relate to a common entity.

The data storage device 102, the computing system 108, and the evaluation system 106 may be communicatively coupled to each other via network 104. The network 104 may be wired, wireless, or any combination of wired and wireless communication networks, such as cellular, Wi-Fi, internet, local area networks, or the like. In one embodiment, the network 104 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

Having described the system 100 at high level, each of the components of the system 100 will be described in detail herein.

Figure 2:
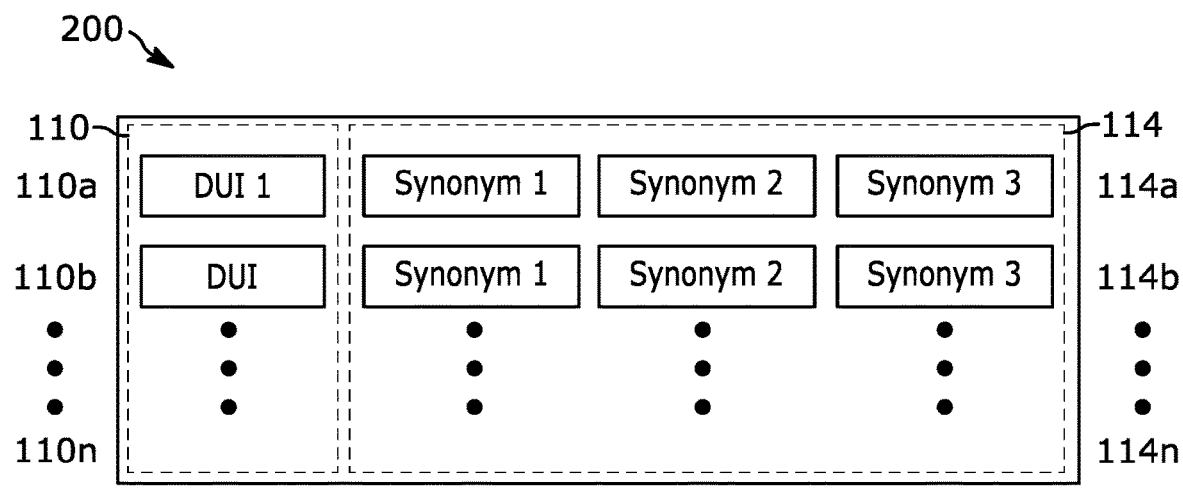
FIG. 2 illustrates a block diagram 200 of an example includes a first list 110 and a second list 114, in accordance with an example embodiment.

FIG. 2 is a block diagram 200 of an example includes first list 110 and the second list 114, consistent with embodiments of the present disclosure. The first list 110 may store records associated with DUIs. The second list 114 may store one or more synonyms associated with each of the DUIs of the first list 110.

For example, the first list 110 may include plurality of records 110a, 110b, . . . 110n. While each of the plurality of records of first list 110 is depicted as a separate row 110a, 110b, . . . 110n in FIG. 2, it will be understood that each such record can be represented in other ways, for example, by a column or any other technique in the art. It will be understood that FIG. 2 is merely example and that first list 110 can include more or less categories of information associated with a DUI.

The second list 114 may store one or more synonyms associated with each of the DUIs of the first list 110. For example, the second list 114 may include plurality of fields 114a, 114b, . . . , 114n. While each record of second list 114 is depicted as a separate row in FIG. 3, it will be understood that each such record can be represented in other ways, for example, by a column or any other technique in the art. It will be understood that FIG. 2 is merely example and that second list 114 may include more or less categories of information associated with each of the DUIs of the first list 110.

The first list 110 and second list 114 can be any type of list, including a data structure, or part of a data structure, a database, or part of a database. Some examples of data structures are arrays, tuples, hash tables, sets, graphs, queues, stacks, etc. An example of a database is a Relational Database Management System (RDBMS) that stores the transaction data as rows in relational tables. Alternatively, the first list 110 and second list 114 may be a column-oriented database management system that stores data as sections of columns of data rather than rows of data. This column-oriented DBMS can have advantages, for example, for data warehouses, customer relationship management systems, and library card catalogues, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible.

A column-oriented DBMS can store data by serializing each column of data of the first list 110 and second list 114.

Figure 3:
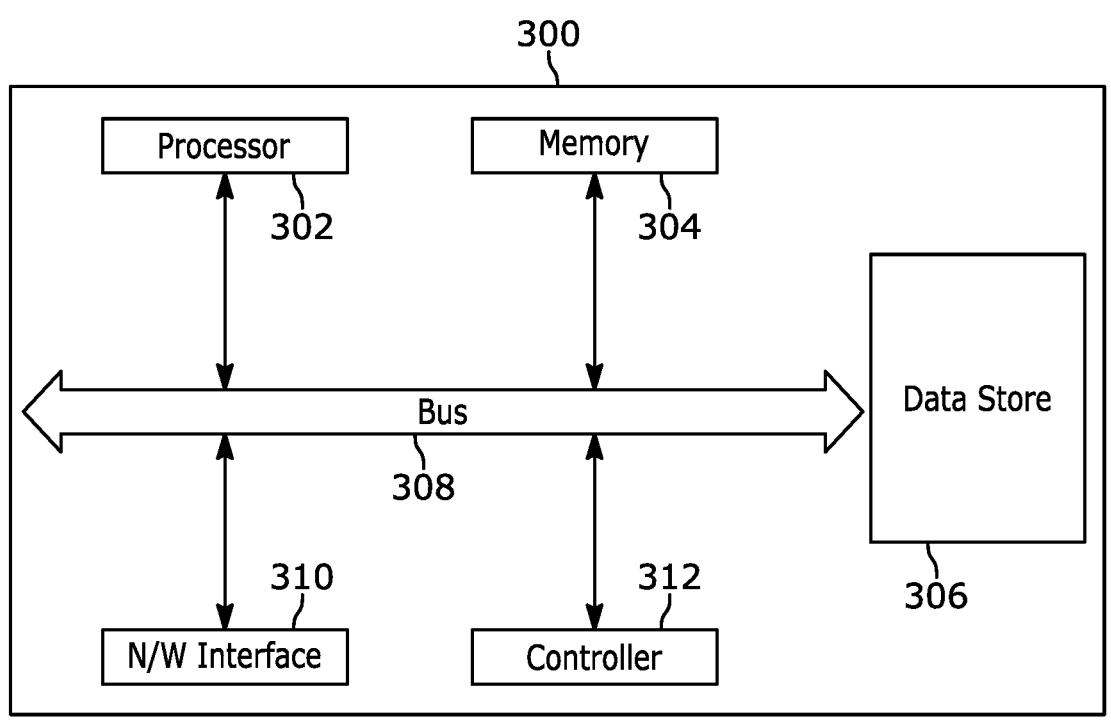
FIG. 3 illustrates a block diagram of a computing system 300, in accordance with one or more example embodiments.

FIG. 3 is a block diagram of an example computing system 300, consistent with embodiments of the present disclosure. The computing system 300 comprises a processor 302, a memory 304, a datastore 306, a bus 308, a network interface 310, and a controller 312.

The computing system 300 comprises the processor 302 for processing information. The term "processor" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The processor 302 may be embodied in a number of different ways. For example, the processor 302 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally, or alternatively, the processor 302 may include one or more processors configured in tandem via the bus to enable independent execution of instructions, pipelining and/or multithreading.

Additionally, or alternatively, the processor 302 may include one or more processors capable of processing large volumes of workloads and operations to provide support for big data analysis. In an example embodiment, the processor 302 may be in communication with the memory 304 via the bus 308 for passing information among components of the computing system 300.

Alternatively, as another example, when the processor 302 is embodied as an executor of software instructions, the instructions may specifically configure the processor 302 to perform the algorithms and/or operations described herein when the instructions are executed. However, in some cases, the processor 302 may be a processor specific device (for example, a mobile terminal or a fixed computing device) configured to employ an embodiment of the present invention by further configuration of the processor 302 by instructions for performing the algorithms and/or operations described herein. The processor 302 may include, among other things, a clock, an arithmetic logic unit (ALU) and logic gates configured to support operation of the processor 302.

The computing system 300 comprises the memory 304 storing information and instructions to be executed by processor 302. The term "memory" used herein may refer to any computer-readable storage medium, for example, volatile memory, random access memory (RAM), non-volatile memory, read only memory (ROM), or flash memory. The memory may include a Random-Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof.

The memory 304 may be non-transitory and may include, for example, one or more volatile and/or non-volatile memories. In other words, for example, the memory 304 may be an electronic storage device (for example, a computer readable storage medium) comprising gates configured to store data (for example, bits) that may be retrievable by a machine (for example, a computing device like the processor 302). The memory 304 may be configured to store information, data, contents, applications, instructions, or the like, for enabling the apparatus to carry out various functions in accordance with an example embodiment of the present disclosure. For example, the memory 304 could be configured to buffer input data for processing by the processor 302. As exemplarily illustrated in FIG. 3, the memory 304 may be configured to store instructions for execution by the processor 302. As such, whether configured by hardware or software methods, or by a combination thereof, the processor 302 may represent an entity (for example, physically embodied in circuitry) capable of performing operations according to an embodiment of the present invention while configured accordingly. Thus, for example, when the processor 302 is embodied as an ASIC, FPGA or the like, the processor 302 may be specifically configured hardware for conducting the operations described herein.

The computing system 300 comprises the datastore 306. The instructions received by memory 304 may optionally be stored on datastore 306 either before or after execution by processor 302. The datastore 306 may be a magnetic disk, an optical disk, or a USB thumb drive (Flash drive), or any other suitable computer readable storage medium.

The computing system 300 comprises the bus 308 for communicating information. The processor 302, the memory 304, the datastore 306, and the network interface 310 may communicate with each other via the bus 308.

The computing system 300 comprises the network interface 310. The network interface 310 may provide a two-way data communication coupling to a network link. For example, network interface 310 may be an integrated services digital network (ISDN) card, cable modem, satellite modem, or a modem to provide a data communication connection to a corresponding type of telephone line. As another example, network interface 310 may be a local area network (LAN) card to provide a data communication connection to a compatible LAN. Wireless links can also be implemented. In any such implementation, network interface 310 may send and receive electrical, electromagnetic, or optical signals that carry digital data streams representing various types of information.

The computing system 300 comprises the controller 312. The term "controller" is used herein to refer to any method or system for controlling and should be understood to encompass microprocessors, microcontrollers, programmable digital signal processors, integrated circuits, computer software, computer hardware, electrical circuits, application specific integrated circuits, programmable logic devices, programmable gate arrays, programmable array logic, personal computers, chips, and any other combination of discrete analog, digital, or programmable components, or other devices capable of providing processing functions.

Figure 4:
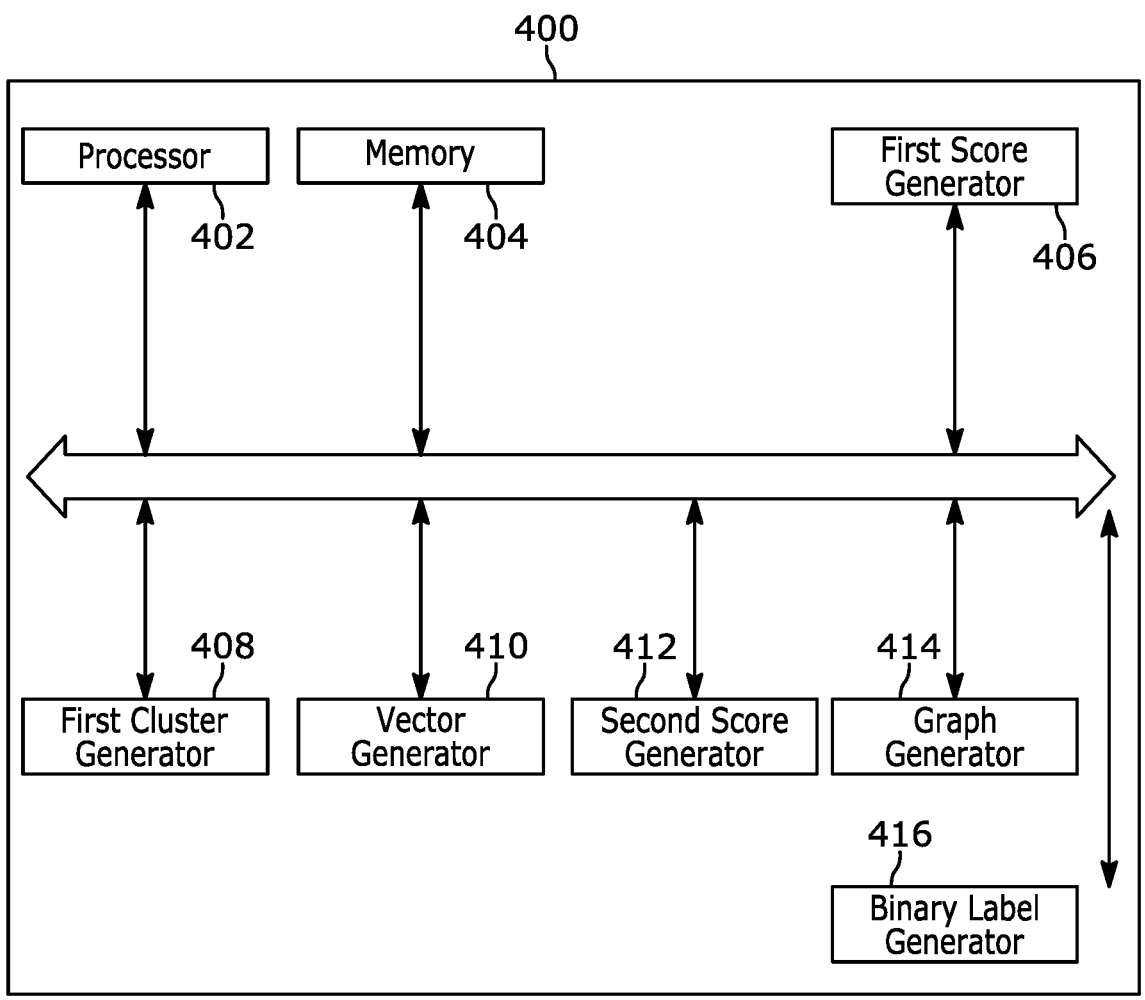
FIG. 4 is a block diagram of an evaluating system 400, in accordance with an example embodiment.

FIG. 4 is a block diagram of an example evaluating system 400, consistent with embodiments of the present disclosure. The evaluating system 400 comprises a processor 402, a memory 404, a first score generator 406, a first cluster generator 408, a vector generator 410, a second score generator 412, a graph generator 414, and a binary label generator 416. In another embodiment similarity can be computed directly for example but not limited to Levenshtein distance where an array of strings or characters may be considered as a vector.

The evaluating system 400 can be a computing system configured to evaluate the performance of the cluster algorithm. For example, the evaluating system 400, may be a computer system configured to execute software or a set of programmable instructions that collect or receive records from different lists for example, the first list 110 and the second list 114, and process those records to associate related records to common entities.

The evaluating system 400 may include one or more computing devices (e.g., server(s)), memory storing data and/or software instructions (e.g., database(s), memory device(s), etc.), and other known computing components. According to some embodiments, the evaluating system 400 may include one or more networked computers that execute processing in parallel or use a distributed computing architecture. The evaluating system 400 may be configured to communicate with one or more components of system 100, and it can be configured to provide evaluation information via an interface(s) accessible by users over a network (e.g., the Internet). For example, the evaluating system 400 may include a web server that hosts a web page accessible through network 104. In some embodiments, the evaluating system 400 may include an application server configured to provide data to one or more client applications executing on computing systems connected to the evaluating system 400 via network 104.

The processor 402 of the evaluation system 400 may be embodied in a number of different ways. For example, the processor 402 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally, or alternatively, the processor 402 may include one or more processors configured in tandem via the bus to enable independent execution of instructions, pipelining and/or multithreading.

Additionally, or alternatively, the processor 402 may include one or more processors capable of processing large volumes of workloads and operations to provide support for big data analysis. In an example embodiment, the processor 402 may be in communication with the memory 404 via a bus (not shown) for passing information among components of the evaluation system 400.

The memory 404 may be non-transitory and may include, for example, one or more volatile and/or non-volatile memories. In other words, for example, the memory 404 may be an electronic storage device (for example, a computer readable storage medium) comprising gates configured to store data (for example, bits) that may be retrievable by a machine (for example, a computing device like the processor 402). The memory 404 may be configured to store information, data, content, applications, instructions, or the like, for enabling the apparatus to carry out various functions in accordance with an example embodiment of the present invention. For example, the memory 402 may be configured to buffer input data for processing by the processor 402.

The term "memory" used herein may refer to any computer-readable storage medium, for example, volatile memory, random access memory (RAM), non-volatile memory, read only memory (ROM), or flash memory. The memory may include a Random-Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof.

The evaluation system 400 comprises the first score generator 406 which is further configured to generate one or more similarity score. The evaluation system 400 may read data from multiple lists (for example, first list 110 and second list 114) from one or more data storage devices (for example, data storage device 102). The first score generator 406 may be configured to compute pairwise similarity between a given input string and each of the list of synonyms in the second list 114. In an embodiment, the given input string may be a user defined string, entered using the computing system 400. In another embodiment, the given input string may be a predetermined string.

Based on the computed pairwise similarity for the given input string and each of the list of synonyms, a similarity score may be generated for each comparison. In other words, a first list of similarity scores comprising similarity scores for each comparison is generated. In an embodiment, general machine learning techniques may be implemented for calculating the first list of similarity scores. Such machine learning techniques may implement for example, but not limited to, Euclidean distance, Manhattan distance, Minkowski distance, Cosine similarity, Jaccard similarity, or any suitable method for calculating similarity.

The evaluation system 400 comprises the first cluster generator 408 which is configured to generate one or more clusters based on the first list of similarity scores, wherein each cluster includes records that have some relationship with one another. In an embodiment, one or more clusters may be identified/generated by the first cluster generator 408 using any general clustering algorithm, including but not limited to connected components, spectral clustering, maximum likelihood clique detection, modularity, other algorithms known to those skilled in the art, or any combination thereof.

In an embodiment, the evaluation system 400 may include one or more cluster generators that may be executed in parallel or serially, in any combination.

The evaluation system 400 comprises the vector generator 410 which is configured to generate one or more vectors. In an embodiment, the vector generator 410 may be configured to generate a vector corresponding to the given input string. In another embodiment, the vector generator 410 may be configured to generate vectors corresponding each of the list of synonyms of the second list 114. In an embodiment, the one or more generated vectors may be Term frequency-Inverse document frequency (TfIdf) vectors.

The second score generator 412, of the evaluation system 400, is configured to generate one or more second scores of similarities corresponding to one or more generated vectors. In an embodiment, the second score generator 412 calculates similarities between two of the generated TfIdf vectors based on their corresponding score in the first list of cosine-similarity.

The evaluation system 400 further comprises the graph generator 414. The graph generator 414 is configured to generate a tree structured graph based on the one or more clusters generated by the first cluster generator 408. The graph generator 414 may define a hierarchy of nested clusters based on the one or more clusters. The graph generator 414 may be configured to calculate similarities of any of the two clusters from the nested clusters in order to define the hierarchy of nested clusters. In an embodiment, minimum pairwise similarity between the synonyms of the two clusters is used to calculate similarities between the two clusters. In another embodiment, average pairwise similarity between the synonyms of the two clusters is used to calculate similarities between the two clusters. In another embodiment, maximum pairwise similarity between the synonyms of the two clusters is used to calculate similarities between the two clusters.

The clusters having maximum pairwise similarity may be merged together in the hierarchy of nested clusters. The clusters having minimum pairwise similarity may form separate clusters in the hierarchy of nested clusters. Thus, the graph generator 414 may generate the hierarchy of nested clusters, and based on the hierarchy of nested clusters, the graph generator 414 may further generate the tree structured graph. The tree structured graph comprises nodes corresponding to each cluster in the hierarchy of nested clusters.

In an embodiment, the hierarchy of nested clusters may be generated using a top-down approach i.e., a single cluster is divided successively based on the pairwise similarity to generate the hierarchy of nested clusters. In another embodiment, the hierarchy of nested clusters may be generated using a bottom-up approach i.e., one or more clusters are merged together based on the pairwise similarity to generate the hierarchy of nested clusters.

In an embodiment, the graph generator 414 may further be configured to calculate distance between each node in the tree structured graph, where each node represents the cluster in the hierarchy of nested clusters. In an embodiment, the tree structured graph may be a dendogram and the calculated distance may be a dendogram distance or cophenetic-distance.

The evaluation system 400 further comprises the binary label generator 416. The binary label generator 416 assigns a binary label for each pair in the hierarchy of nested clusters. In an embodiment, the binary label generator 416 may assign a label 1 in case each pair is associated with a same DUI of the first list 110, and 0 otherwise. In another embodiment, the binary label generator 316 may assign a label 0 in case each pair is associated with a same DUI of the first list 110, and 1 otherwise. In other embodiments performance evaluation metrics such as but not limited to Rand Index, Mutual Information, and Homogeneity may be used.

Figure 5:
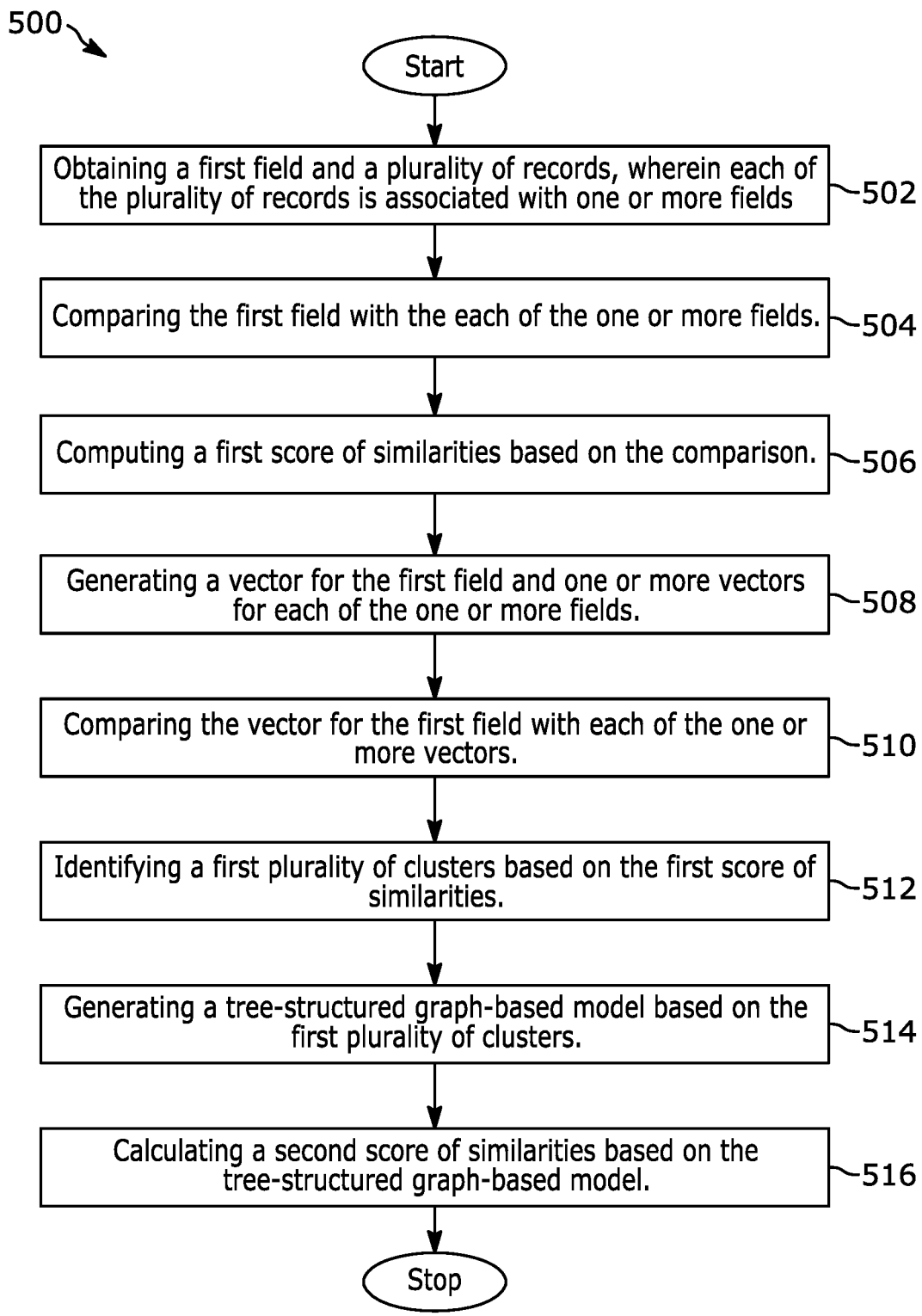
FIG. 5 illustrates a method 500 for evaluating the performance of the cluster algorithm, in accordance with an example embodiment.

FIG. 5 illustrates a method 500 for evaluating the performance of the cluster algorithm, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 404 of the evaluation system 400, employing an embodiment of the present disclosure and executed by a processor 402. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 500 illustrated by the flow diagram of FIG. 5 for evaluating the performance of the cluster algorithm may include, at step 502, obtaining a first field and a plurality of records, wherein each of the plurality of records is associated with one or more fields. As discussed in FIGS. 1-4, the evaluation system 400 obtains the given input string and the records from the first 110 and 114. In an embodiment, the evaluating system 400, may be configured to collect or receive records from different lists for example, the first list 110 and the second list 114, and process those records to associate related records to common entities. In an embodiment, the first field may be referred to as the given input string. In an embodiment, the given input string may be a user defined string, entered using the computing system 300. In another embodiment, the given input string may be a predetermined string.

The method 500, at step 504, may include comparing the first field with the each of the one or more fields. The evaluation system 400 comprises the first score generator 406 which is further configured to generate one or more similarity score. The evaluation system 400 may read data from multiple lists (for example, first list 110 and second list 114) from one or more data storage devices (for example, data storage device 102).

The method 500, at step 506, may include computing a first score of similarities based on the comparison. The first score generator 406 may be configured to compute pairwise similarity between a given input string and each of the list of synonyms in the second list 114.

Based on the computed pairwise similarity for the given input string and each of the list of synonyms, a similarity score may be generated for each comparison. In other words, a first list of similarity scores comprising similarity scores for each comparison is generated. In an embodiment, general machine learning techniques may be implemented for calculating the first list of similarity scores. Such machine learning techniques may implement for example, but not limited to, Euclidean distance, Manhattan distance, Minkowski distance, Cosine similarity, Jaccard similarity, or any suitable method for calculating similarity.

The method 500, at step 508, may include generating a vector for the first field and one or more vectors for each of the one or more fields. The evaluation system 400 comprises the vector generator 410 which is configured to generate one or more vectors. In an embodiment, the vector generator 410 may be configured to generate a vector corresponding to the given input string. In another embodiment, the vector generator 410 may be configured to generate vectors corresponding each of the list of synonyms of the second list 114. In an embodiment, the one or more generated vectors may be Term frequency-Inverse document frequency (TfIdf) vectors.

The method 500, at step 510, may include comparing the vector for the first field with each of the one or more vectors. The second score generator 412, of the evaluation system 400, is configured to generate one or more second scores of similarities corresponding to one or more generated vectors. In an embodiment, the second score generator 412 calculates similarities between two of the generated TfIdf vectors based on their corresponding score in the first list of similarity.

The method 500, at step 512, may include identifying a first plurality of clusters based on the first score of similarities. The evaluation system 400 comprises the first cluster generator 308 which is configured to generate one or more clusters based on the first list of similarity scores, wherein each cluster includes records that have some relationship with one another. In an embodiment, one or more clusters may be identified/generated by the first cluster generator 408 using any general clustering algorithm, including but not limited to connected components, spectral clustering, maximum likelihood clique detection, modularity, other algorithms known to those skilled in the art, or any combination thereof.

In an embodiment, the evaluation system 400 may include one or more cluster generators that may be executed in parallel or serially, in any combination.

The method 500, at step 514, may include generating a tree-structured graph-based model based on the first plurality of clusters. The evaluation system 400 further comprises the graph generator 414. The graph generator 414 is configured to generate a tree structured graph based on the one or more clusters generated by the first cluster generator 408. The graph generator 414 may define a hierarchy of nested clusters based on the one or more clusters. The graph generator 414 may further be configured to calculate similarities of any of the two clusters from the nested clusters in order to define the hierarchy. In an embodiment, minimum pairwise similarity between the synonyms of the two clusters is used to calculate similarities between the two clusters. In another embodiment, average pairwise similarity between the synonyms of the two clusters is used to calculate similarities between the two clusters. In another embodiment, maximum pairwise similarity between the synonyms of the two clusters is used to calculate similarities between the two clusters.

The clusters having maximum pairwise similarity may be merged together in the hierarchy of nested clusters. The clusters having minimum pairwise similarity may form separate clusters in the hierarchy of nested clusters. Thus, the graph generator 414 may generate the hierarchy of nested clusters, and based on the hierarchy of nested clusters, the graph generator 414 may further generate the tree structured graph. The tree structured graph comprises nodes corresponding to each cluster in the hierarchy of nested clusters.

In an embodiment, the hierarchy of nested clusters may be generated using a top-down approach i.e., a single cluster is divided successively based on the pairwise similarity to generate the hierarchy of nested clusters. In another embodiment, the hierarchy of nested clusters may be generated using a bottom-up approach i.e., one or more clusters are merged together based on the pairwise similarity to generate the hierarchy of nested clusters.

The method 500, at step 516, may include calculating a second score of similarities based on the tree-structured graph-based model. The graph generator 414 may be configured to calculate distance between each node in the tree structured graph, where each node represents the cluster in the hierarchy of nested clusters. In an embodiment, the tree structured graph may be a dendogram and the calculated distance may be a dendogram distance or cophenetic-distance.

In an embodiment, the method 500 may further include splitting, based at least in part on the plurality of records, the one or more fields into a plurality of subsets, and generating one or more pairs from the plurality of subsets.

In an embodiment, the method 500 may further include splitting, based at least in part on the plurality of records, the one or more fields into a plurality of subsets, and generating one or more pairs from the plurality of subsets.

In an embodiment, the method 500 may further include assigning a binary label for each of the one or more pairs.

In an embodiment, the method 500 may further include generating a performance score based on the comparison of the vector for the first field with each of the one or more vectors.

In an embodiment, the method 500 may further include calculating cosine similarities based on comparison of the first field with the each of the one or more fields.

In an embodiment, the method 500 may further include generating the tree-structured graph-based model based on the first plurality of clusters comprises merging at least two of the first plurality of clusters.

In an embodiment, the method 500 may further include calculating a distance based on the merging at least two of the first plurality of clusters.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

What is claimed is:

1. A system for evaluating a performance of a cluster algorithm, the system comprising:
    a memory configured to store computer-executable instructions;
    a database comprising a plurality of records, wherein each of the plurality of records is associated with one or more fields;
    a processor operatively coupled to the memory and the database, the processor configured to execute the computer-executable instructions to at least:
        compare a first field with the each of the one or more fields;
        compute a first score of similarities based on the comparison;
        generate a Term-frequency-Inverse document frequency (Tfldf) vector for the first field and one or more Tfldf vectors for each of the one or more fields;
        compare the Tfldf vector for the first field with each of the one or more Tfldf vectors;
        identify a first plurality of clusters based on the first score of similarities and the comparison of the vector for the first field with each of the one or more vectors;
        generate a tree-structured graph-based model based on the first plurality of clusters wherein the tree-structured graph-based model comprises a hierarchy of nested clusters based on the one or more clusters,
        calculate a second score of similarities based on the tree-structured graph-based model.

2. The system of claim 1, wherein the processor is further configured to execute the computer-executable instructions to assign a binary label for each of the one or more pairs.

3. The system of claim 1, wherein the processor is further configured to execute the computer-executable instructions to generate a performance score based on the comparison of the Tfldf vector for the first field with each of the one or more Tfldf vectors.

4. The system of claim 1, wherein computing the first score of similarities based on the comparison comprises calculating cosine similarities based on comparison of the first field with the each of the one or more fields.

5. The system of claim 1, wherein generating the tree-structured graph-based model based on the first plurality of clusters comprises merging at least two of the first plurality of clusters.

6. The system of claim 5, wherein the processor is further configured to execute the computer-executable instructions to calculate a distance based on the merging at least two of the first plurality of clusters.

7. The system of claim 6, wherein the second score of similarities is calculated based on the distance.

8. The system of claim 1, wherein the plurality of records comprises one or more disease unique id (DUI).

9. The system of claim 1, wherein the one or more fields comprises one or more synonyms associated with the DUI.

10. A method comprising:
    obtaining a first field and a plurality of records, wherein each of the plurality of records is associated with one or more fields;
    comparing the first field with the each of the one or more fields;
    computing a first score of similarities based on the comparison;
    generating a Term-frequency-Inverse document frequency (Tfldf) vector for the first field and one or more Tfldf vectors for each of the one or more fields;
    comparing the Tfldf vector for the first field with each of the one or more Tfldf vectors;
    identifying a first plurality of clusters based on the first score of similarities;
    generating a tree-structured graph-based model based on the first plurality of clusters wherein the tree-structured graph-based model comprises a hierarchy of nested clusters based on the one or more clusters;
    calculating a second score of similarities based on the tree-structured graph-based model.

11. The method of claim 10, further comprises assigning a binary label for each of the one or more pairs.

12. The method of claim 10, further comprising generating a performance score based on the comparison of the Tfldf vector for the first field with each of the one or more Tfldf vectors.

13. The method of claim 10, wherein computing the first score of similarities based on the comparison comprises calculating cosine similarities based on comparison of the first field with the each of the one or more fields.

14. The method of claim 10, wherein generating the tree-structured graph-based model based on the first plurality of clusters comprises merging at least two of the first plurality of clusters.

15. The method of claim 14, further comprising calculating a distance based on the merging at least two of the first plurality of clusters.

16. The method of claim 15, wherein the second score of similarities is calculated based on the distance.

17. The method of claim 10, wherein the plurality of records comprises one or more disease unique id (DUI).

18. A non-transitory computer-readable storage medium having stored thereon computer executable instruction which when executed by one or more processors, cause the one or more processors to perform the operations comprising:
    obtaining a first field and a plurality of records, wherein each of the plurality of records is associated with one or more fields;
    comparing the first field with the each of the one or more fields;

computing a first score of similarities based on the comparison;

generating a Term-frequency-Inverse document frequency (Tfldf) vector for the first field and one or more Tfldf vectors for each of the one or more fields;

comparing the Tfldf vector for the first field with each of the one or more Tfldf vectors;

identifying a first plurality of clusters based on the first score of similarities;

generating a tree-structured graph-based model based on the first plurality of clusters wherein the tree-structured graph-based model comprises a hierarchy of nested clusters based on the one or more clusters;

calculating a second score of similarities based on the tree-structured graph-based model.

* * * * *